(12) United States Patent
Goudarzi

(10) Patent No.: US 9,864,466 B2
(45) Date of Patent: Jan. 9, 2018

(54) MITIGATING COMMON MODE DISPLAY NOISE USING HYBRID ESTIMATION APPROACH

(71) Applicant: Synaptics Incorporated, San Jose, CA (US)

(72) Inventor: Katayoun Goudarzi, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 185 days.

(21) Appl. No.: 14/985,690

(22) Filed: Dec. 31, 2015

(65) Prior Publication Data

US 2017/0192605 A1    Jul. 6, 2017

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0414* (2013.01); *G06F 2203/04102* (2013.01)

(58) Field of Classification Search
CPC ...... G06F 3/0418; G06F 3/0414; G06F 3/044; G06F 3/0412; G06F 2203/04102
USPC ........................................................ 345/174
See application file for complete search history.

(56) References Cited

U.S. PATENT DOCUMENTS

| | | | |
|---|---|---|---|
| 6,177,918 B1 | 1/2001 | Colgan et al. | |
| 6,215,477 B1 | 4/2001 | Morrison et al. | |
| 6,310,611 B1 | 10/2001 | Caldwell | |
| 7,315,300 B2 | 1/2008 | Hill et al. | |
| 8,121,806 B2 | 2/2012 | Mahowald et al. | |
| 8,400,422 B2 | 3/2013 | Chang et al. | |
| 8,411,066 B2 | 4/2013 | Cordeiro et al. | |
| 8,456,443 B2 | 6/2013 | Bulea et al. | |
| 8,471,570 B2 | 6/2013 | Portmann | |
| 8,508,503 B2 | 8/2013 | Lin et al. | |
| 8,536,880 B2 | 9/2013 | Philipp | |
| 8,648,835 B2 | 2/2014 | Rapakko | |
| 8,692,802 B1 | 4/2014 | Maharyta et al. | |
| 8,723,833 B2 | 5/2014 | Curtis et al. | |
| 8,736,573 B2 | 5/2014 | Byun et al. | |
| 8,902,192 B2 | 12/2014 | Miyamoto et al. | |
| 8,947,373 B2 | 2/2015 | Kremin et al. | |

(Continued)

OTHER PUBLICATIONS

International Search Report and Written Opinion for PCT/US2016/067267, dated Aug. 9, 2017, 11 pages.

*Primary Examiner* — Jonathan Boyd
(74) *Attorney, Agent, or Firm* — Osha Liang LLP

(57) ABSTRACT

A processing system configured for capacitive sensing includes sensor circuitry with functionality to acquire an absolute capacitive profile for sensor electrodes, and acquire a transcapacitive image using the sensor electrodes. The processing system is configured to create a first estimate of common mode noise using the absolute capacitive profile and the transcapacitive image, determine a location lacking an input object in the transcapacitive image using the first estimate of common mode noise, create a second estimate of common mode noise based on the location and the transcapacitive image, determine positional information of the input object using the second estimate of common mode noise, and process the positional information.

20 Claims, 8 Drawing Sheets

(56) References Cited

U.S. PATENT DOCUMENTS

| | | |
|---|---|---|
| 9,081,435 B2 | 7/2015 | Kim et al. |
| 2002/0089491 A1 | 7/2002 | Willig |
| 2006/0007171 A1 | 1/2006 | Burdi et al. |
| 2009/0174675 A1 | 7/2009 | Gillespie et al. |
| 2010/0079401 A1 | 4/2010 | Staton |
| 2010/0079402 A1 | 4/2010 | Grunthaner et al. |
| 2011/0242045 A1 | 10/2011 | Park et al. |
| 2011/0242050 A1 | 10/2011 | Byun et al. |
| 2012/0133599 A1 | 5/2012 | Cho et al. |
| 2012/0139846 A1 | 6/2012 | Krah et al. |
| 2012/0139868 A1 | 6/2012 | Mamba et al. |
| 2012/0182252 A1 | 7/2012 | Brosnan et al. |
| 2012/0200524 A1 | 8/2012 | Vallis et al. |
| 2012/0206407 A1 | 8/2012 | Taylor et al. |
| 2012/0249476 A1 | 10/2012 | Schwartz et al. |
| 2012/0262384 A1 | 10/2012 | Kim et al. |
| 2012/0306803 A1 | 12/2012 | Kuo |
| 2013/0176233 A1 | 7/2013 | Lin et al. |
| 2013/0221993 A1 | 8/2013 | Ksondzyk et al. |
| 2013/0265242 A1 | 10/2013 | Richards et al. |
| 2014/0062938 A1 | 3/2014 | Bulea |
| 2014/0062952 A1 | 3/2014 | Savitsky et al. |
| 2014/0062953 A1 | 3/2014 | Savitsky et al. |
| 2015/0002445 A1 | 1/2015 | Brunet et al. |
| 2015/0015528 A1* | 1/2015 | Vandermeijden ..... G06F 3/0416 345/174 |
| 2015/0029137 A1 | 1/2015 | Cheng et al. |
| 2015/0097802 A1 | 4/2015 | Kim et al. |
| 2015/0103042 A1 | 4/2015 | Lee et al. |
| 2015/0138145 A1 | 5/2015 | Hwang et al. |
| 2015/0145802 A1 | 5/2015 | Yao et al. |
| 2015/0153870 A1 | 6/2015 | Lee et al. |

* cited by examiner

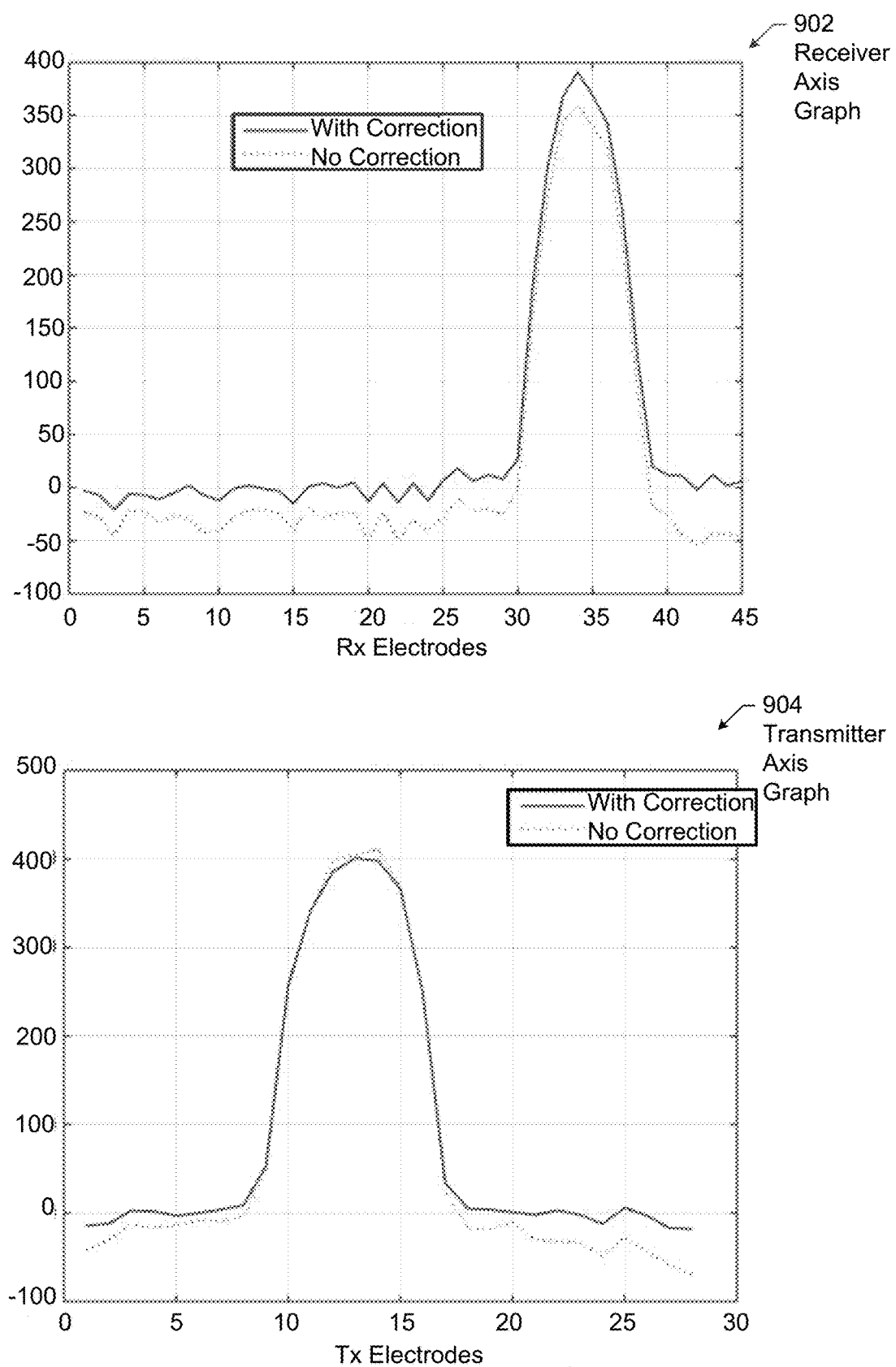
FIG. 9.1

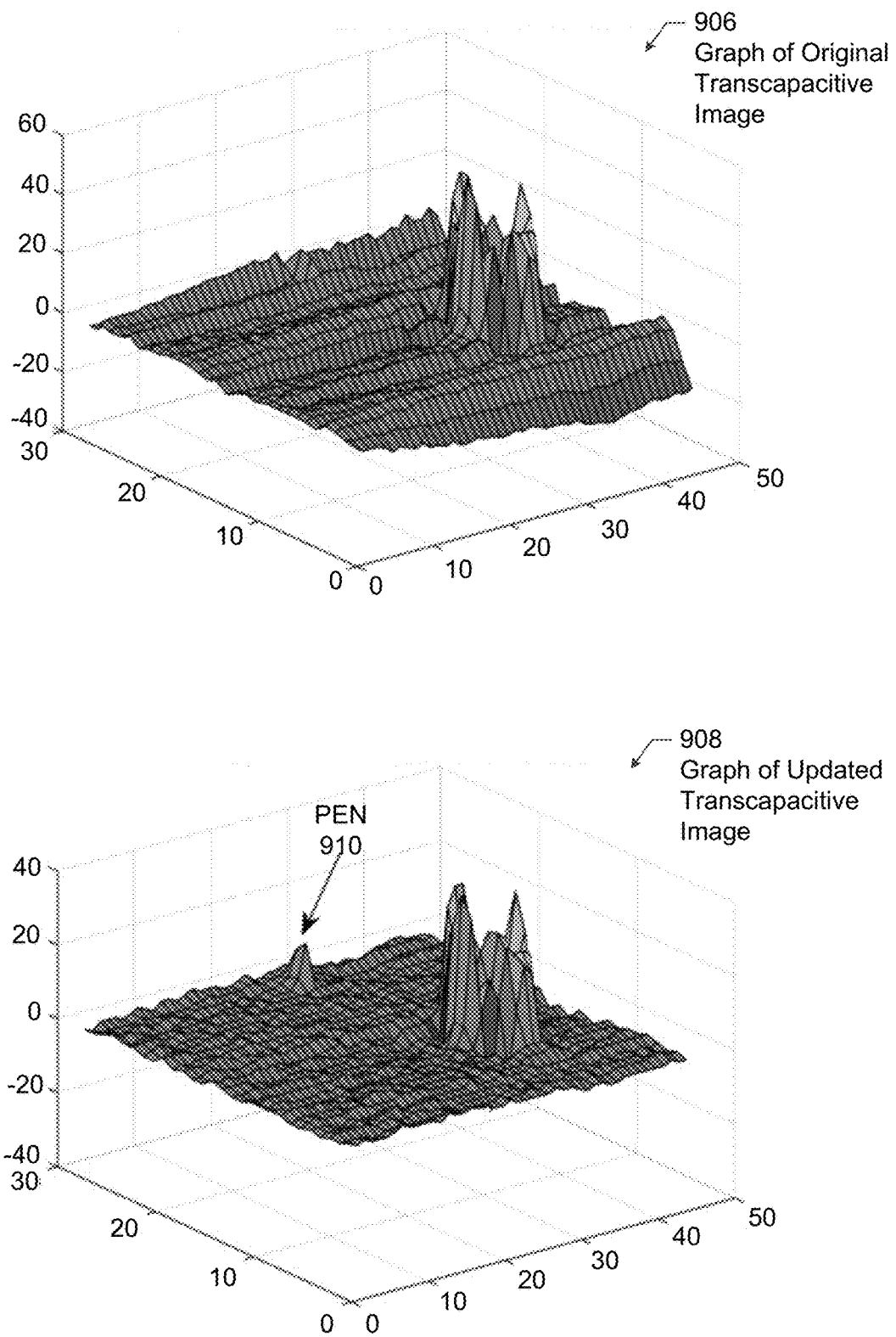
FIG. 9.2

MITIGATING COMMON MODE DISPLAY NOISE USING HYBRID ESTIMATION APPROACH

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system configured for capacitive sensing. The processing system includes sensor circuitry with functionality to acquire an absolute capacitive profile for sensor electrodes, and acquire a transcapacitive image using the sensor electrodes. The processing system is configured to create a first estimate of common mode noise using the absolute capacitive profile and the transcapacitive image, determine a location lacking an input object in the transcapacitive image using the first estimate of common mode noise, create a second estimate of common mode noise based on the location and the transcapacitive image, determine positional information of the input object using the second estimate of common mode noise, and process the positional information.

In general, in one aspect, one or more embodiments relate to an input device for capacitive sensing the include device includes sensor electrodes for receiving resulting signals from a transmitter electrode, and a processing system. The processing system is configured to acquire a first absolute capacitive profile for the sensor electrodes, acquire a transcapacitive image using the sensor electrodes, create a first estimate of common mode noise using the first absolute capacitive profile and the transcapacitive image, and determine a location lacking an input object in the transcapacitive image using the first estimate of common mode noise. The processing system is further configured to create a second estimate of common mode noise based on the location and the transcapacitive image, determine positional information of the input object using the second estimate of common mode noise, and process the positional information.

In general, in one aspect, one or more embodiments relate to a method for mitigating common mode noise. The method includes acquiring a first absolute capacitive profile for the sensor electrodes, acquiring a transcapacitive image using the sensor electrodes, creating a first estimate of common mode noise using the first absolute capacitive profile and the transcapacitive image, and determining a location lacking an input object in the transcapacitive image using the first estimate of common mode noise. The method further includes creating a second estimate of common mode noise based on the location and the transcapacitive image, determining positional information of the input object using the second estimate of common mode noise, and processing the positional information.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 9.1 and 9.2 show an example in accordance with one or more embodiments of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements. Similarly, the ordinal number used in the Specification may or may not match the ordinal numbers used for elements in the claims.

Various embodiments of the present invention provide input devices and methods that facilitate improved usability. In particular, one or more embodiments are directed to generating an estimate of common mode noise of an input device. Based on the estimate, positional information may be identified.

Figure 1:
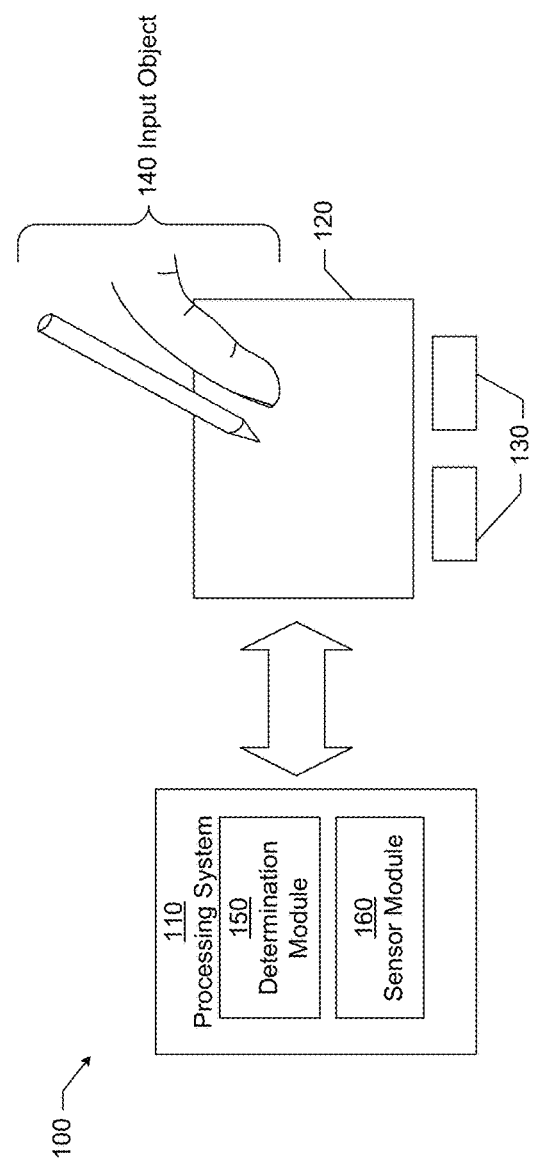
FIG. 1 shows a block diagram of an example system that includes an input device in accordance with one or more embodiments of the invention.

Turning now to the figures, FIG. 1 is a block diagram of an exemplary input device (100), in accordance with one or more embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes such as desktop computers, laptop computers, netbook computers, tablets, web browsers, e-book readers, and personal digital assistants (PDAs). Additional example electronic systems include composite input devices such as physical keyboards that include input device (100) and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling.

In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. The processing system may include sensor circuitry. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions such as operating display screens, driving haptic actuators, etc.

The processing system (110) may be implemented as a set of modules that handle different functions of the processing system (110). Each module may include circuitry that is a part of the processing system (110). For example, circuitry may be an application specific integrated circuit (ASIC), a general hardware processor, or any combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
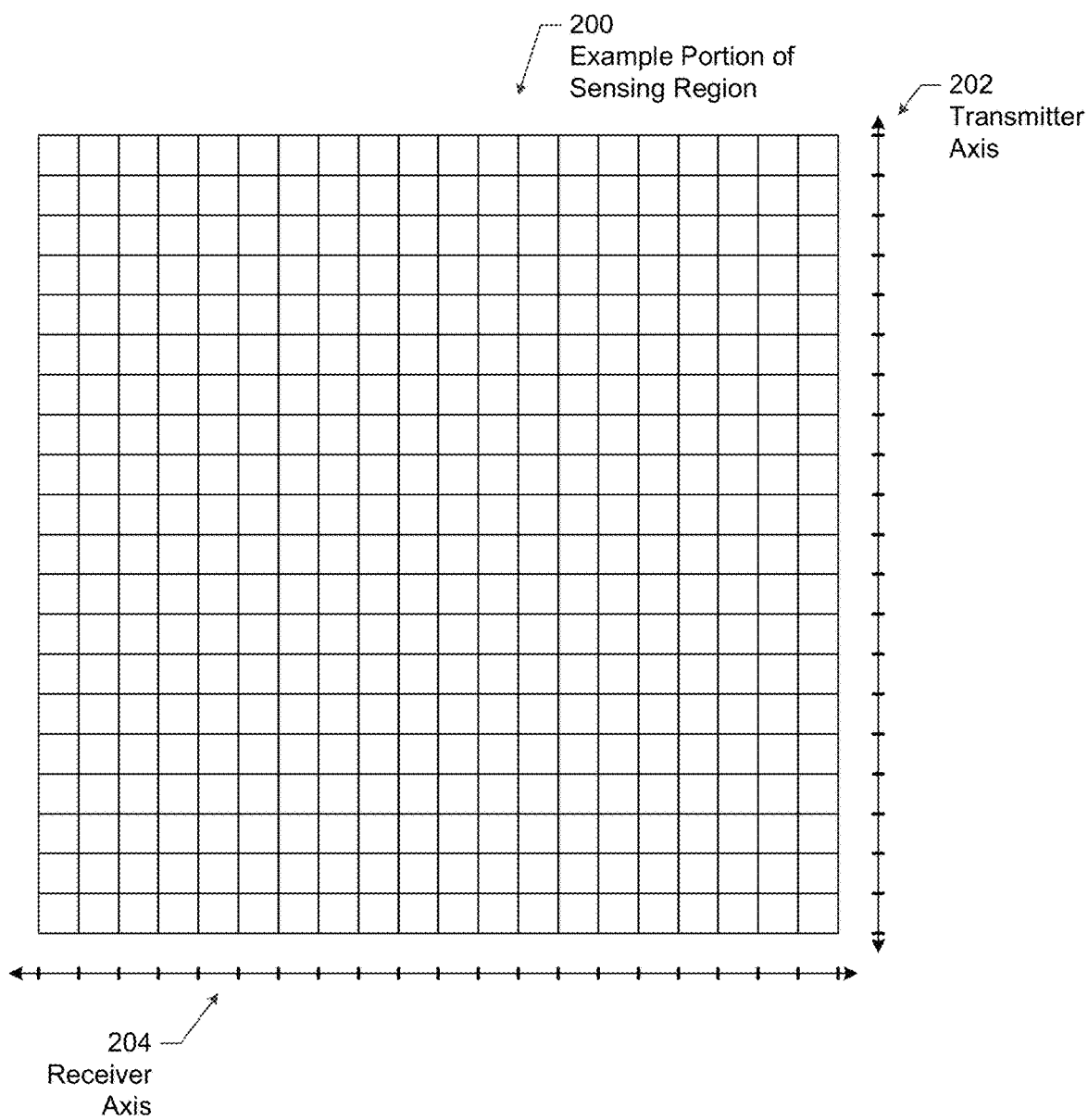
FIG. 2 shows a diagram of a sensing region in accordance with one or more embodiments of the invention.

FIG. 2 shows an example diagram of portion of a sensing region (200) in accordance with one or more embodiments of the invention. In one or more embodiments of the invention, the sensing region has a transmitter axis (202) and a receiver axis (204). The transmitter axis (202) has a set of transmitter electrodes that include functionality to transmit transmitter signals. The receiver axis includes a set of receiver electrodes that include functionality to receive resulting signals. The transmitter electrodes and receiver electrodes are sensor electrodes. For transcapacitive sensing, when a transmitter electrode, or sensor electrode on the transmitter axis, transmit a transmitter signal, the resulting signals are received by the receiver electrodes, or second set sensor electrodes, on the receiver axis. Measurements obtained from the resulting signals may be referred to as capacitive sensor data. The measurements that are used may be raw measurements or pre-processed measurements. In one or more embodiments, the capacitive sensor data obtained by performing the transcapacitive sensing using each transmitter electrode may form a two dimensional capacitive image. In the two dimensional capacitive image, each intersection between the transmitter electrode and the receiver electrode has a corresponding value. In other words, the use of the term transcapacitive image refers to a set of measurements whereby each intersection has a measurement value. The image may or may not be in diagram form, whereby the measurement values are color or grayscale encoded or otherwise displayable.

Continuing with FIG. 2, one or more embodiments may include functionality to perform hybrid sensing. In other words, the input device shown in FIG. 1 may include functionality to obtain one or more profiles from the sensing region. A profile is a single dimensional set of values from the sensing region along a particular axis of the sensing region. For example, a receiver axis absolute capacitance profile is a profile obtained along the receiver axis (204) of the sensing region (200). Notably, the receiver axis absolute capacitance profile does not reference the function of the sensor electrodes during the acquisition of the profile as being receivers, but rather the function of the sensor electrodes in the corresponding mutual capacitance or active pen sensing. Namely, the receiver axis absolute capacitance profile refers to a profile acquired along the sensor electrodes, which, during transcapacitive sensing, the sensor electrodes are on the receiver axis. Conversely, the transmitter axis absolute capacitance profile refers to the profile acquired along the sensor electrodes, which, during the transcapacitive sensing, the sensor electrodes are on the transmitter axis. Thus, rather than being a two dimensional capacitive image of the sensing region, the collection of values in the receiver axis profile or the transmitter axis profile are single dimensional and include a single raw measured value for each hatch mark shown in FIG. 2 on the transmitter axis (202) and receiver axis (204).

Further, a receiver axis projection is a projection of the transcapacitive image on the receiver axis. A transmitter axis projection is a projection of the transcapacitive image on the transmitter axis. Using the example of FIG. 2, a receiver axis projection may have a single value for each column that is the sum of the values in the transcapacitive image that are in the column. A transmitter axis projection may have a single value for each row that is the sum of the values in the transcapacitive image that are in the row.

As discussed above, FIG. 2 is only an example. The size, shape, number and configuration of electrodes may vary from the example shown in FIG. 2 without departing from the scope of the invention. In particular, although FIG. 2 shows the electrodes as being configured in a grid pattern, the electrodes may be arranged in a different pattern. Further, the use of the terms "first" and "second" in the claims with respect to sensor electrodes may refer to the receiver axis and/or the transmitter axis unless specifically claimed.

FIGS. 3-7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
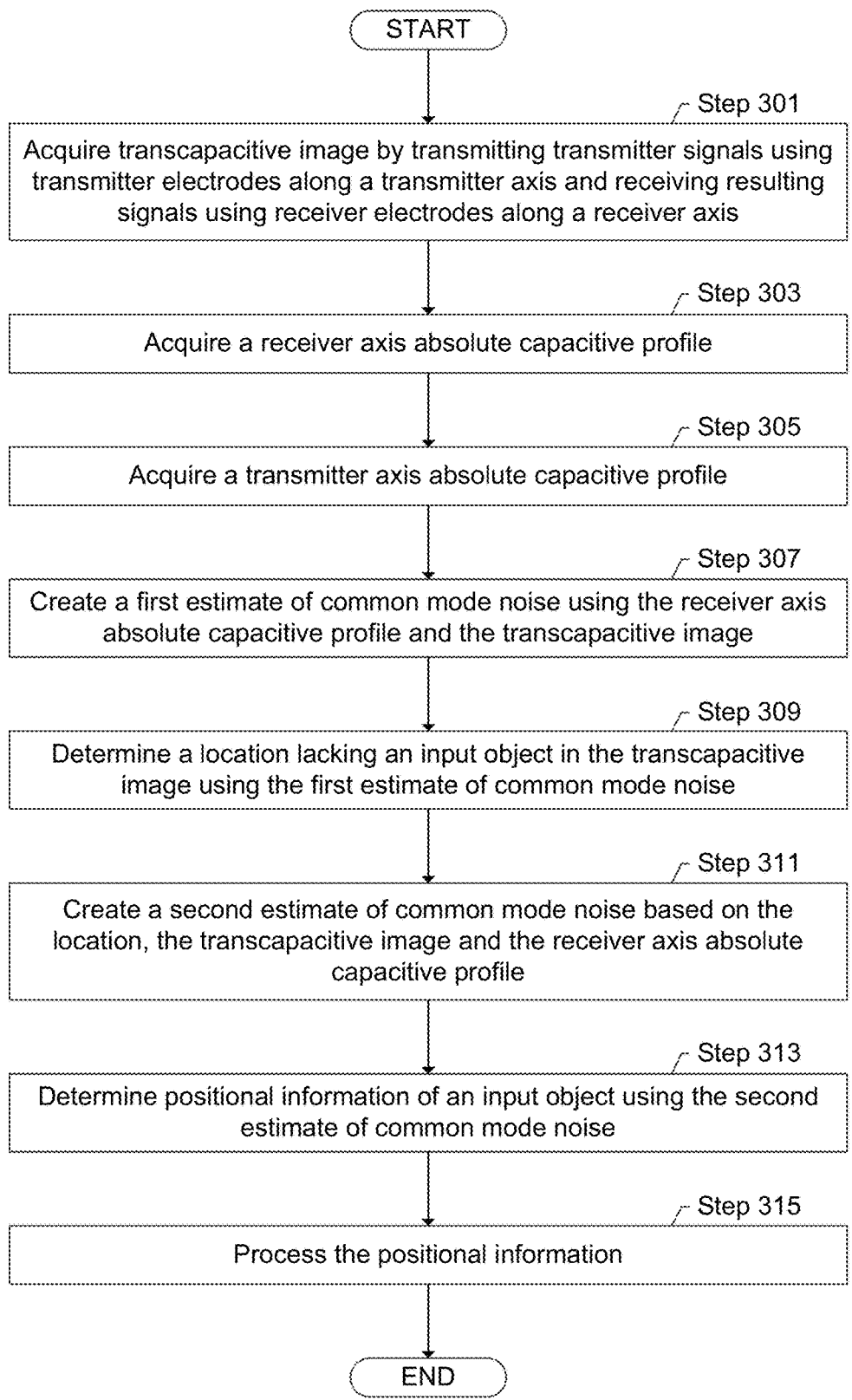
FIGS. 3, 4, 5, 6, and 7 show flowcharts in accordance with one or more embodiments of the invention.

FIG. 3 shows a flowchart for capacitive sensing in accordance with one or more embodiments of the invention. In Step 301, a transcapacitive image is acquired by transmitting transmitter signals using transmitter electrodes along a transmitter axis and receiving resulting signals using receiver electrodes along a receiver axis in accordance with one or more embodiments of the invention. The sensor electrodes receiving the resulting signals may receive the resulting signals concurrently. Further, multiple transmitter electrodes may transmit transmitter signals concurrently using one or more coding schemes or other such techniques.

In one or more embodiments of the invention, the resulting signals include effects of the transmitter signals, any input object in the sensing region, and any noise, such as thermal noise and common mode noise. In other words, measurements of the resulting signals are affected by input objects in the sensing region, the value of the transmitter signals transmitted, and any noise in the sensing region. The resulting signals may be processed to obtain capacitive sensor data. For example, measurements from the resulting signals may be acquired to generate the transcapacitive image. Temporal and/or spatial filters may be applied to the transcapacitive image. Similarly, the baseline may be subtracted from the capacitive sensor data prior to proceeding. Alternatively, the aforementioned preprocessing may be performed after the effects of the noise in the transcapacitive image are mitigated as discussed below.

Continuing with FIG. 3, in Step 303, a receiver axis absolute capacitive profile is acquired for the sensing region. For example, the receiver axis profile may be obtained using absolute capacitance sensing. In other words, the sensor electrodes along the receiver axis may be driven with sensing signals and measurements are acquired from the same sensor electrodes along the receiver axis. The combination of measurements along the receiver axis forms the receiver axis absolute capacitive profile.

Similarly, in Step 305, a transmitter axis absolute capacitive profile is acquired for the sensing region. In particular, the transmitter axis profile may be obtained using absolute capacitance sensing. In other words, the sensor electrodes along the transmitter axis may be driven with sensing signals, and measurements are acquired from the same sensor electrodes along the transmitter axis. The combination of measurements along the transmitter axis forms the receiver axis absolute capacitive profile.

One or more embodiments may perform preprocessing on the receiver axis absolute capacitive profile and the transmitter axis absolute capacitive profile. For example, the preprocessing may be performed to account for a baseline, remove other sources of noise, apply temporal and/or spatial filters, and perform other processing.

Although Steps 301-305 are discussed in a particular order, as discussed above, the above steps may be performed in parallel and/or in a different order. For example, concurrently or at the same time that transcapacitive sensing is performed, absolute capacitance sensing may be on the transmitter and/or the receiver axis. By way of another example, performing the absolute capacitive sensing may be prior to performing the transcapacitive sensing. Other variations may exist without departing from the scope of the invention.

In Step 307, a first estimate of common mode noise is created using the receiver axis absolute capacitive profile and the transcapacitive image in accordance with one or more embodiments of the invention. In one or more embodiments, the first estimate of common mode noise is an initial estimate of noise in the transcapacitive image. In other words, using the relationship between measurements in the transcapacitive image and measurements in the profile, the first estimate of common mode noise may be generated.

In Step 309, a location lacking an input object is determined in the transcapacitive image using the first estimate of common mode noise. A location lacking an input object is a location that lacks the effects of an input object in the sensing region. In particular, locations lacking an input object do not correspond to a possible location of an input object, do not have input object coupled noise that is caused by the input object, do not have effects caused by low ground mass and the input object (e.g., negative regions that do not have an input object and correspond to presence of two diagonally placed input objects because of low ground mass), and/or do not have other effects from any input object in the sensing region. As discussed above, the first estimate of common mode noise in the transcapacitive image may be a rough estimate of the common mode noise and may be used to identify possible locations having effects of input objects in the sensing region. In particular, the rough estimate of common mode noise is subtracted from each of the measurement values in the transcapacitive image to create a revised transcapacitive image. In the revised transcapacitive image, possible location(s) having effects of input object(s) may have elevated absolute value of the measurement values. In other words, the elevated measurement values are measurement values which each have an absolute value that is greater than a detection threshold. Locations lacking elevated measurement values may correspond to regions that do not have an input object. Thus, by disregarding locations having a possible input object, the remaining locations may be determined to lack an input object.

In Step 311, a second estimate of common mode noise in the transcapacitive image is created using the location and the transcapacitive image. The second estimate may be assumed to be the actual noise in the transcapacitive image. In other words, whereas the first estimate is a rough estimate, the second estimate may exhibit minimal error. Creating the second estimate may be performed based on the location lacking an input object being assumed to have only noise as well as the known effects of the transmitter signals. Thus, the location lacking an input object provides an estimate of common mode noise. In some embodiments, with a particularly small input object, such as a stylus tip, the second estimate of common mode noise may be determined directly from the locations lacking the input object and the transcapacitive image. In other embodiments, an absolute capacitive profile is used. Further, the second estimate may be re-calculated for the entire transcapacitive image and/or for the portion of the transcapacitive image corresponding to the possible locations of an input object.

In Step 313, positional information of an input object is determined using the second estimate of common mode noise in accordance with one or more embodiments of the invention. In particular, similar to the first estimate, the original, potentially preprocessed, transcapacitive image may be adjusted for the second estimate. For example, the second estimate may be subtracted from the transcapacitive image. In one or more embodiments of the invention, the second estimate includes a value for each pixel in the transcapacitive image. Thus, subtracting the second estimate from the transcapacitive image may be performed by identifying the pixel and subtracting the value in the second estimate from the corresponding pixel in the transcapacitive image to obtain a revised image. For example, processing the revised transcapacitive image may be performed using segmentation to identify clumps in the revised capacitive image, performing peak detection for each clump, filtering erroneous input objects (e.g., palms or other large input objects) based on size and other attributes of the clumps, and performing other processing. In one or more embodiments, for each clump, the position of an input object may correspond to a peak in a clump. Thus, the position may be added as part of the positional information. Additional information, such as the size of the clump and the value in the transcapacitive image at the position, may be added to the positional information. Information from one or both profiles may be used to identify a distance of the input object from the surface sensing region.

In Step 315, the positional information is processed in accordance with one or more embodiments of the invention. For example, the input device may report the positional information to the host device. If the host device executes the all or part of the processing system, the processing system may report the positional information to a host operating system, or the host operating system may report the positional information to an application. Processing the positional information may include performing an action based on the positional information. For example, the host device may change the state of the display of the user interface, change the state of the host device or perform another action.

Figure 4:
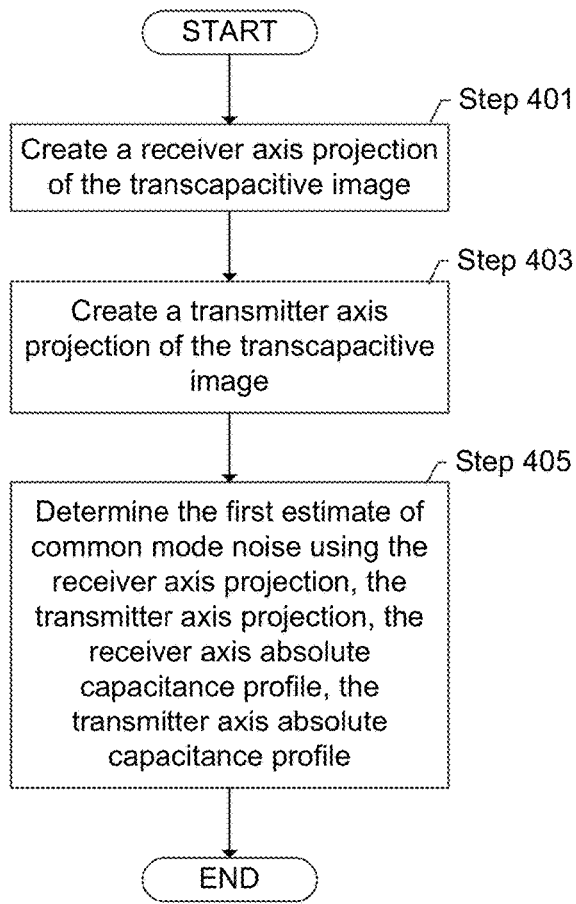

Turning to FIG. 4, FIG. 4 shows a flowchart for creating a first estimate of common mode noise in accordance with one or more embodiments of the invention. In particular, the Steps of FIG. 4 may be performed to perform Step 307 of FIG. 3 (discussed above). In Step 401 of FIG. 4, a receiver axis projection of the transcapacitive image is created in accordance with one or more embodiments of the invention. The receiver axis projection is created by, individually and for each sensor electrode along the receiver axis, summing the measurement values of the pixels along the receiver axis sensor electrode. Thus, the result is a single value for each sensor electrode along the receiver axis. Combined, such as in an array having a value for each sensor electrode, the resulting values form a receiver axis projection. Other operations may be performed to create a receiver axis projection in accordance with one or more embodiments of the invention.

Similarly, in Step 403, a transmitter axis projection of the transcapacitive image is created in accordance with one or more embodiments of the invention. The transmitter axis projection is created by, individually and for each sensor electrode along the transmitter axis, summing the measurement values of the pixels along the transmitter axis sensor electrode. Thus, the result is a single value for each sensor electrode along the transmitter axis. Combined, the measurement resulting values form a transmitter axis projection. Other operations may be performed to create a transmitter axis projection in accordance with one or more embodiments of the invention.

In Step 405, the first estimate of common mode noise is determined using the receiver axis projection, the transmitter axis projection, the receiver axis absolute capacitive profile, and the transmitter axis absolute capacitive profile. In some embodiments, a grounding mass parameter is determined and used to create the first estimate of common mode noise. The grounding mass parameter is a value that estimates the degree to which the capacitive input device is electrically grounded. For example, the grounding may be through a user or a conductive surface. In other embodiments, such as when a user has the capacitive input device on a table, the input device may be poorly grounding. The degree to which the input device is grounded may vary between different and adjacent frames of measurements. In other words, for a first sensing frame, the input device may be in a high ground mass environment, whereas for a subsequent frame, the input device is a low ground mass environment. Thus, the grounding mass parameter may vary between sensing frames, and may be determined for each sensing frame. In one or more embodiments of the invention may be determined directly or indirectly.

In some embodiments, determining the grounding mass parameter may be performed by setting the grounding mass parameter as a constant. In such embodiments, one or more embodiments may exhibit a higher degree of accuracy when the input device is in the grounded state reflected by the constant grounding mass parameter as opposed to other grounding states.

In other embodiments, the grounding mass parameter may be calculated. Calculating the grounding mass parameter may be performed, for example, using the flowchart of FIG. 5. Continuing with FIG. 4, in some embodiments, rather than directly calculating the grounding mass parameter and then using the grounding mass parameter, equations for determining the first estimate of common mode noise may be manipulated such that the grounding mass parameters is not explicitly calculated, but rather the calculations are used to form the equations for determining the first estimate of common mode noise.

Continuing with Step 405 of FIG. 4, determining the first estimate of common mode noise may be performed based on the relationship between the transmitter axis projection and the transmitter axis absolute capacitance profile. In particular, the shape of the transmitter axis projection should match the shape of the transmitter axis absolute capacitance profile. One or more embodiments minimize the norm of the error between the transmitter axis projection shape and the transmitter axis absolute capacitance profile shape, while accounting for the common mode noise. In other words, one or more embodiments generate values of common mode noise that minimize the norm of the error between the transmitter axis projection shape and the transmitter axis absolute capacitance profile shape. In some embodiments, the entire transmitter axis absolute capacitance profile and transmitter axis projection is used to determine the first estimate of common mode noise. In other embodiments, only a portion of the transmitter axis absolute capacitance profile and the corresponding portion of the transmitter axis projection are used to determine the first estimate of common mode noise.

Figure 5:
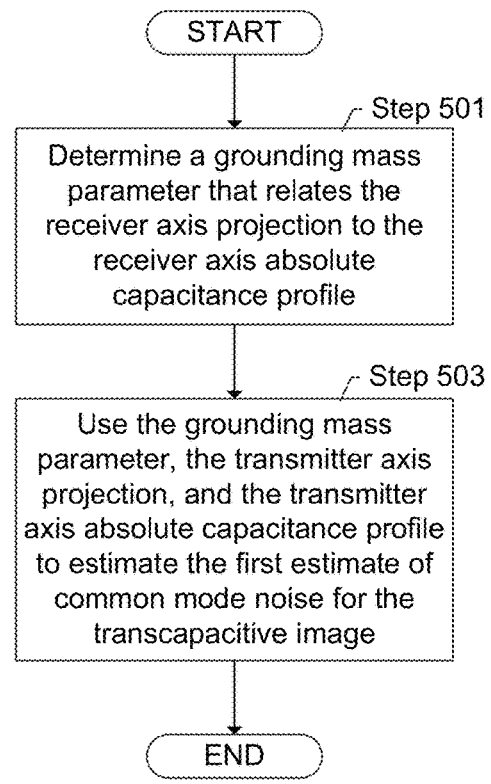

FIG. 5 shows a flowchart for determining the first estimate of common mode noise using a grounding mass parameter in accordance with one or more embodiments of the invention. In Step 501, a grounding mass parameter that relates the receiver axis projection to the receiver axis absolute capacitance profile is determined in accordance with one or more embodiments of the invention. In one or more embodiments, determining the grounding mass parameter may be performed as follows. The shape of the receiver axis projection should match the shape of the receiver axis absolute capacitance profile. The degree to which the receiver axis shapes match is dependent on the grounding mass parameter. Thus, one or more embodiments generate values of common mode noise that minimize the norm of the error between the receiver axis projection shape and the receiver axis absolute capacitance profile shape.

In Step 503, using the grounding mass parameter, the transmitter axis projection, and the transmitter axis absolute capacitance profile, the first estimate of common mode noise for the transcapacitive image is estimated. Estimating the first estimate of common mode noise may be performed as discussed above with reference to Step 405 of FIG. 4.

In one or more embodiments, the grounding mass parameter discussed above is with respect to the receiver axis. A transmitter axis grounding mass parameter may be calculated. For example, the grounding mass parameter for the transmitter axis may be calculated using the same or similar steps discussed above with reference to Step 501, but for the transmitter axis instead of the receiver axis. By way of another example, a transmitter axis grounding mass parameter may be calculated by performing a calibration step to determine a constant value that relates the transmitter axis grounding mass parameter to the receiver axis grounding mass parameter. After performing the calibration, by multiplying the receiver axis grounding mass parameter by the constant value, the transmitter axis grounding mass parameter may be calculated. In Step 503, the transmitter axis grounding mass parameter may be used to determine the first estimate of common mode noise.

Figure 6:
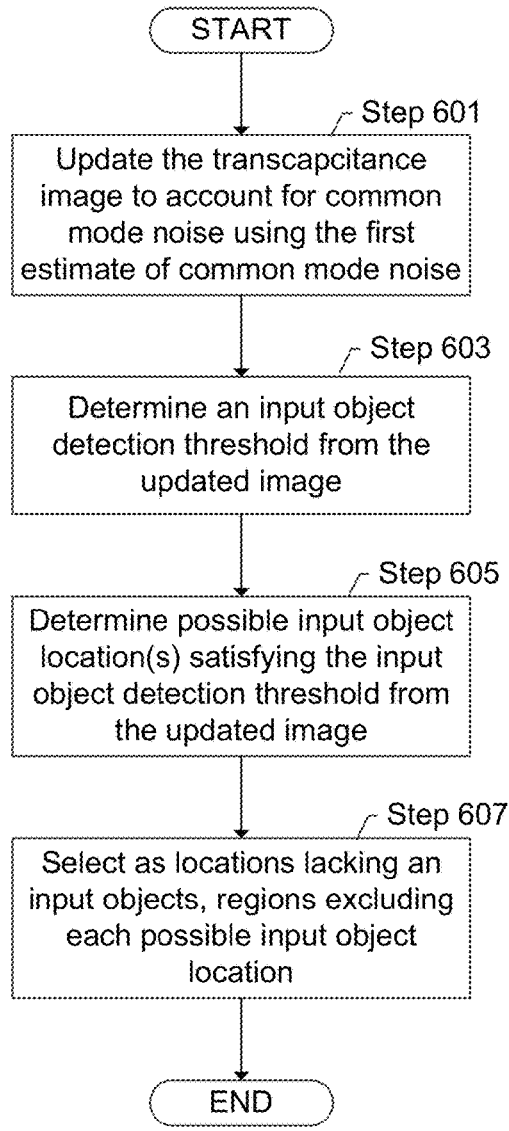

FIG. 6 shows a flowchart for identifying a location lacking an input object in accordance with one or more embodiments of the invention. In Step 601, the transcapacitive image is updated to account for common mode noise using the first estimate of common mode noise. Updating the transcapacitive image may be performed as discussed above with reference to Step 309 of FIG. 3.

In Step 603 of FIG. 6, an input object detection threshold is determined from the updated image. The input object detection threshold is a minimum value of a pixel in the updated image by which an input object is determined to be at the location of the pixel. In other words, the absolute value of the pixel satisfying the input object detection threshold is greater than determined noise. In one or more embodiments, the input object detection threshold is the same throughout the image. In one or more embodiments of the invention, determining the input object detection threshold may be performed as follows. A variance of the common mode noise across the pixels in the first estimate of common mode noise is calculated. A variance of the thermal noise may be calculated. The thermal noise may be a predefined value or a calculated value and reflects noise due to thermal state of the input device. The variance of the common mode noise may be added to the variance of the thermal noise to generate a variance of total noise. The square root of the variance of the total noise may be multiplied by a constant to generate the input object detection threshold in one or more embodiments of the invention. In equation form, the above description is Input Object Detection Threshold= (constant)*(square root (thermal noise variance+common mode noise variance)). By way of example purposes only, the constant may be a value such as four. Other values of the constant may be used without departing from the scope of the invention.

In Step 605, possible input object locations that satisfy the input object detection threshold are determined from the updated image in accordance with one or more embodiments of the invention. In one or more embodiments of the invention, the absolute value of each pixel in the updated image is compared with the input object detection threshold. If the absolute value of the pixel is greater than the input object detection threshold, then the pixel may be determined to be a possible input object location.

In Step 607, locations lacking input objects are selected as regions excluding each possible input object location. In other words, if the absolute value of the pixel is not greater than, or, in some embodiments, equal to the input object detection threshold, then the pixel may be determined to be a location lacking an input object. The pixel may be marked as a location lacking an input object. In one or more embodiments, rather than a single threshold, multiple thresholds may be used. For example, a first threshold may exist for possible input object locations while a second threshold may exist for locations lacking an input object. Rather than selecting all locations, one or more embodiments may select regions having a strict subset of locations.

Selecting regions may be performed as follows. In one or more embodiments, a sensor electrode on the transmitter axis is selected. A determination is made whether pixels along the sensor electrode have a threshold number of pixels corresponding to locations lacking an input object. For example, for a sensor electrode, a determination may be made whether more than a threshold number of pixels along the sensor electrode have a value in the updated image that is less than the input object detection threshold. By way of an example threshold number, the threshold number may be seven. Other threshold numbers may be used without departing from the scope of the invention. If the sensor electrode has more than the threshold number of pixels corresponding to locations lacking an input object, then the sensor electrode may be marked as corresponding to a region lacking an input object. Notably, an input object may exist in the region if the threshold number is greater than zero in one or more embodiments. In one or more embodiments, the sensor electrodes that are selected as regions correspond to transmitter electrodes along the transmitter axis.

In one or more embodiments of the invention, only a single region is selected as corresponding to a region lacking an input object. For example, only a single sensor electrode may be selected. In other embodiments, multiple regions may be selected. For example, every region satisfying the threshold number may be selected. By way of another example, a defined number of regions may be selected. For example, the defined number may be fifty percent of the possible regions that satisfy the threshold number. The number of regions that are selected may affect the degree of accuracy in the second estimate of common mode noise in the transcapacitive image as well as the time to generate the second estimate.

Figure 7:
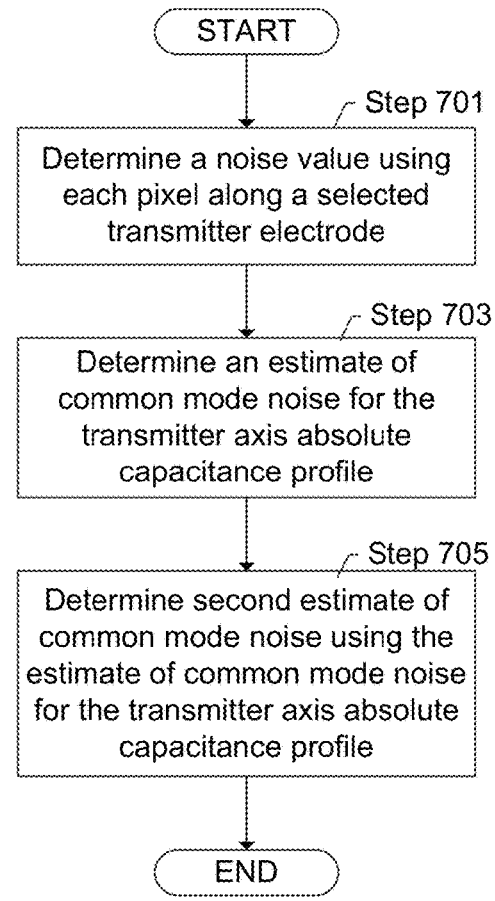

FIG. 7 shows a flowchart for using selected regions to generate the second estimate of common mode noise in the transcapacitive image in accordance with one or more embodiments of the invention. In particular, FIG. 7 shows a flowchart whereby the region corresponds to a transmitter electrode. In Step 701, a noise value is determined using each pixel along the selected transmitter electrode. In one or more embodiments of the invention, the selected transmitter electrode corresponds to the region in Step 607 of FIG. 6 lacking an input object that is selected. The noise value is an aggregated value that uses the values of the pixels in the original transcapacitive image. In other words, because the pixels on the transmitter axis lack an input object, the values of the pixels may be assumed to be noise. In one or more embodiments, the aggregated value is an average of the value of the pixels along the selected transmitter electrode. Other aggregations may be used without departing from the scope of the invention.

In Step 703, an estimate of common mode noise is determined for the transmitter axis absolute capacitive profile using the noise value in accordance with one or more embodiments of the invention. In other words, the noise value may be set as a constant value for noise when solving the equations discussed above with reference to Step 405 of FIG. 4. With the additional information as to the possible locations of the input objects that is determined from the updated image, one or more embodiments provide a more accurate estimate of common mode noise when matching the shapes of the transmitter axis absolute capacitive profile and the transmitter axis projection. In one or more embodiments, the ground mass parameter may be deemed to be the same as computed above using the receiver axis projection and the receiver axis absolute capacitive profile. Estimating the common mode noise may be performed by minimizing the norm of the square error between the transmitter axis absolute capacitive profile and the transmitter axis projection, while having the grounding mass parameter and the noise value as constants.

In Step 705, the second estimate of common mode noise is determined from the estimate of common mode noise for the transmitter axis absolute capacitive profile. Determining the second estimate of common mode noise may be performed as discussed above with respect to determining the first estimate of common mode noise. However, as discussed above, using the fact that the possible locations of input objects are known, the noise value for the locations may be known. Thus, the second estimate is more accurate than the first estimate.

Determining the second estimate of common mode noise may be performed as follows. A second estimate of common mode noise may be determined for one or more regions lacking an input object. Further, the second estimate of common mode noise for the regions, or a subset thereof, may be used in conjunction with the transmitter axis absolute capacitance profile, or a subset thereof, and the transmitter axis projections, or a subset thereof, and grounding mass parameter to estimate the final version of common mode noise for transmitter axis absolute capacitance profile. The estimation may be performed by way of shape matching and minimizing error between the transmitter axis absolute capacitance profile and transmitter axis projection. This final estimate is then used in conjunction with the transmitter axis projection and transmitter axis absolute capacitance profile and the grounding mass parameter to estimate the common mode noise in the transcapacitive image for the regions that a second estimate was not computed or the whole image again.

Although not shown in FIG. 7, using the second estimate of common mode noise for the transcapacitive image, an estimate of common mode noise for the receiver axis may be determined. In particular, using a same technique discussed above for generating an updated image using the first estimate, an updated transcapacitive image may be generated using the second estimate of common mode noise. A receiver axis projection may be determined from the updated image. By comparing the shapes of the receiver axis projection, or a subset thereof, to the receiver axis absolute capacitive profile, or a subset thereof, and minimizing the square error between the projection and the profile, or the subsets of the projection and profile, by selecting appropriate values for noise for the receiver axis profile, an estimate of common mode noise for the receiver axis profile may be determined. The estimate of common mode noise for the receiver axis profile may be used to update the receiver axis profile. Using the updated receiver axis profile and updated transmitter axis profile, positional information may be determined. For example, the positional information may be the distance of the input object to the sensing region, or other positional information.

Although FIG. 7 shows determining the estimate of common mode noise for the transmitter axis absolute capacitance profile, in some embodiments, Step 703 may be omitted. For example, if the only possible location of an input object in the transcapacitive image is a small area, such as a stylus, then the noise information for the remaining regions may be used to determine the noise for the locations corresponding to the stylus.

Although not discussed above, in one or more embodiments of the invention, locations lacking an input object in the transcapacitive image may be mapped to the transmitter axis absolute capacitance profile and/or the receiver axis absolute capacitive profile. In such embodiments, only a portion of the transmitter axis absolute capacitance profile and/or the receiver axis absolute capacitive profile that lack an input object are used to generate an estimate of common mode noise for the corresponding profile.

Figure 8:
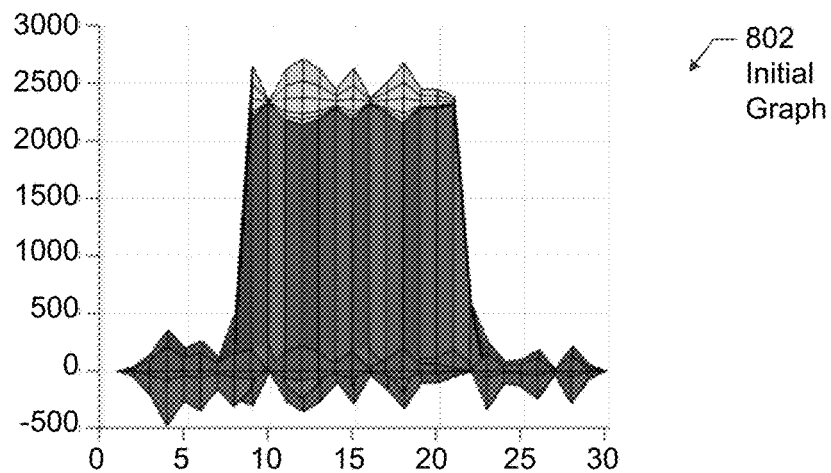
FIG. 8 shows an example in accordance with one or more embodiments of the invention.
Figure 8:
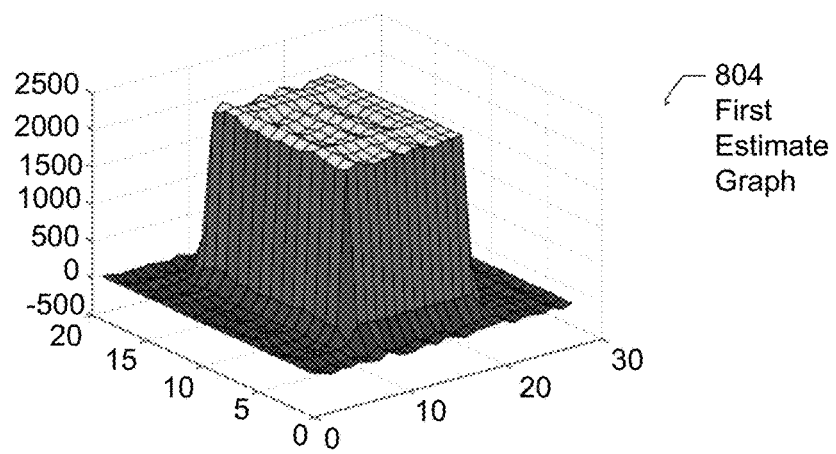
Figure 8:
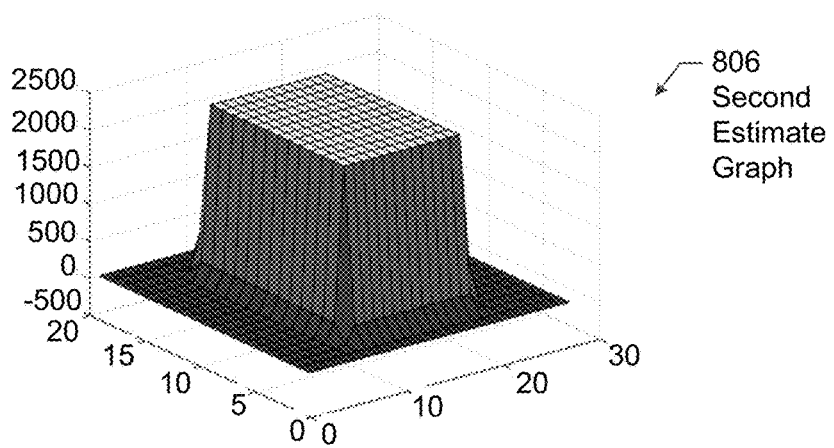

FIG. 8 shows an example set of graphs of a sensing region having an input object in accordance with one or more embodiments of the invention. In the graphs, the vertical axis represents the measurement values, while the remaining axis corresponds to the transmitter axis and the receiver axis. Positions having higher values on the vertical axis may correspond to the input object. In particular, initial graph (802) is a graph of a transcapacitive image in which common mode noise is present and reflected in the measurement values of the transcapacitive image. As shown by the amount of variation, automated processing of the transcapacitive image in order to obtain positional information and without adjusting for noise may be challenging based on the degree of variability.

The first estimate graph (804) shows a graph of the transcapacitive image after the transcapacitive image is updated for the first estimate of common mode noise. As shown in the first estimate graph, the updated image accounting for the first estimate of common mode noise may have some variation due to noise, but is smoother than the initial graph (802).

The second estimate graph (806) shows a graph of the transcapacitive image after the transcapacitive image is updated for the second estimate of common mode noise. As shown in the second estimate graph, the updated image accounting for the second estimate of common mode noise is smoother than the first estimate graph (804) and provides a more accurate depiction of the sensing region with the input object in accordance with one or more embodiments of the invention.

FIGS. 9.1 and 9.2 show another example in accordance with one or more embodiments of the invention. In the example shown in FIGS. 9.1 and 9.2, a pen and a 30 millimeter slug are present in the sensing region. FIG. 9.1 shows a receiver axis graph (902) of the receiver axis absolute capacitive profile, and a transmitter axis graph (904) of the transmitter axis absolute capacitive profile in accordance with one or more embodiments of the invention. In the graphs shown, the dotted lines show the profiles without being adjusted for common mode noise, the solid lines show the profiles adjusted for common mode noise.

FIG. 9.2 shows graphs of transcapacitive images in accordance with one or more embodiments of the invention. In particular, FIG. 9.2 shows a graph of the original transcapacitive image (906) and a graph of the updated image adjusted for common mode noise (908) in accordance with one or more embodiments of the invention. As shown in FIG. 9.2, whereas the original transcapacitive image has too much common mode noise to show the pen, the common mode noise is reduced in the updated transcapacitive image such that the pen position (910) has elevated values.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system configured for capacitive sensing, the processing system comprising:
    sensor circuitry with functionality to:
        acquire a first absolute capacitive profile for a first plurality of sensor electrodes; and
        acquire a transcapacitive image using the first plurality of sensor electrodes;
    wherein the processing system is configured to:
        create a first estimate of common mode noise using the first absolute capacitive profile and the transcapacitive image;
        determine a location lacking an input object in the transcapacitive image using the first estimate of common mode noise;
        create a second estimate of common mode noise based on the location and the transcapacitive image;
        determine positional information of the input object using the second estimate of common mode noise; and
        process the positional information.

2. The processing system of claim 1, wherein the first plurality of sensor electrodes are receiver electrodes, and wherein acquiring the transcapacitive image comprises transmitting transmitter signals using a second plurality of sensor electrodes and receiving resulting signals using the plurality of receiver electrodes, wherein the resulting signals comprise effects of the transmitter signals.

3. The processing system of claim 1, wherein the processing system is further configured to:
    acquire a second absolute capacitive profile for a second plurality of sensor electrodes,
    wherein creating the first estimate of common mode noise comprises:
        creating a first projection of the transcapacitive image along a first axis, the first axis corresponding to the first plurality of sensor electrodes;
        creating a second projection of the transcapacitive image along a second axis, the second axis corresponding to the second plurality of sensor electrodes; and
        determining the first estimate of common mode noise using the first projection, the second projection, the first absolute capacitance profile, and the second absolute capacitance profile.

4. The processing system of claim 3, wherein determining the first estimate of common mode noise comprises:
   determining a grounding mass parameter that relates the first projection to the first absolute capacitance profile, wherein the grounding mass parameter identifies a grounding state of a sensing region having the input object, and
   using the grounding mass parameter, the second projection, and the second absolute capacitance profile to estimate the first estimate of common mode noise.

5. The processing system of claim 1, wherein the processing system is further configured to:
   acquire a second absolute capacitive profile for a second plurality of sensor electrodes, the second plurality of sensor electrodes corresponding to a transmitter axis comprising a plurality of transmitter electrodes for generating the transcapacitive image, and
   create a third estimate of common mode noise for the second absolute capacitive profile,
   wherein the first estimate of common mode noise is created using the third estimate of common mode noise.

6. The processing system of claim 5, wherein determining the location lacking the input object in the transcapacitive image comprises:
   updating the transcapacitive image to account for common mode noise using the first estimate of common mode noise;
   determining a input object detection threshold from the updated transcapacitive image;
   determining, from the updated image, each possible input object location satisfying the input object detection threshold; and
   selecting, as the location lacking the input object, a region excluding each possible input object in the updated transcapacitive image.

7. The processing system of claim 1, wherein creating the second estimate of common mode noise based on the location and the transcapacitive image comprises:
   determine, using each pixel along a transmitter electrode of a plurality of transmitter electrodes, a noise value for the transmitter electrode, wherein the transmitter electrode corresponds to the location lacking the input object;
   determine a third estimate of common mode noise for a transmitter axis absolute capacitive profile using the noise value; and
   determine the second estimate of common mode noise from the third estimate of common mode noise for the transmitter axis absolute capacitive profile.

8. The processing system of claim 7, wherein the processing system is further configured to:
   generate a fourth estimate of common mode noise for the first absolute capacitive profile.

9. The processing system of claim 1, wherein processing the positional information comprises performing at least one selected from a group consisting of reporting the positional information and changing a state of a host device according to the positional information.

10. An input device for capacitive sensing comprising:
    a first plurality of sensor electrodes for receiving resulting signals from a transmitter electrode; and
    a processing system configured to:
        acquire a first absolute capacitive profile for the first plurality of sensor electrodes;
        acquire a transcapacitive image using the first plurality of sensor electrodes;
        create a first estimate of common mode noise using the first absolute capacitive profile and the transcapacitive image;
        determine a location lacking an input object in the transcapacitive image using the first estimate of common mode noise;
        create a second estimate of common mode noise based on the location and the transcapacitive image;
        determine positional information of the input object using the second estimate of common mode noise; and
        process the positional information.

11. The input device of claim 10, wherein the processing system further comprises functionality to:
    acquire a second absolute capacitive profile for a second plurality of sensor electrodes,
    wherein creating the first estimate of common mode noise comprises:
        creating a first projection of the transcapacitive image along a first axis, the first axis corresponding to the first plurality of sensor electrodes,
        creating a second projection of the transcapacitive image along a second axis, the second axis corresponding to the second plurality of sensor electrodes, and
        determining the first estimate of common mode noise using the first projection, the second projection, the first absolute capacitance profile, and the second absolute capacitance profile.

12. A method for mitigating common mode noise, the method comprising:
    acquiring a first absolute capacitive profile for a first plurality of sensor electrodes;
    acquiring a transcapacitive image using the first plurality of sensor electrodes;
    creating a first estimate of common mode noise using the first absolute capacitive profile and the transcapacitive image;
    determining a location lacking an input object in the transcapacitive image using the first estimate of common mode noise;
    creating a second estimate of common mode noise based on the location and the transcapacitive image;
    determining positional information of the input object using the second estimate of common mode noise; and
    processing the positional information.

13. The method of claim 12, wherein the first plurality of sensor electrodes are receiver electrodes, and wherein acquiring the transcapacitive image comprises transmitting transmitter signals using a second plurality of sensor electrodes and receiving resulting signals using the plurality of receiver electrodes, wherein the resulting signals comprises effects of the transmitter signals.

14. The method of claim 12, further comprising:
    acquiring a second absolute capacitive profile for a second plurality of sensor electrodes,
    wherein creating the first estimate of common mode noise comprises:
        creating a first projection of the transcapacitive image along a first axis, the first axis corresponding to the first plurality of sensor electrodes,
        creating a second projection of the transcapacitive image along a second axis, the second axis corresponding to the second plurality of sensor electrodes, and determining the first estimate of common mode noise using the first projection, the second projection, the first absolute capacitance profile, and the second absolute capacitance profile.

15. The method of claim 14, wherein determining the first estimate of common mode noise comprises:
determining a grounding mass parameter that relates the first projection to the first absolute capacitance profile, wherein the grounding mass parameter identifies a grounding state of a sensing region having the input object, and
using the grounding mass parameter, the second projection, and the second absolute capacitance profile to estimate the first estimate of common mode noise.

16. The method of claim 12, further comprising:
acquiring a second absolute capacitive profile for a second plurality of sensor electrodes, the second plurality of sensor electrodes corresponding to a transmitter axis comprising a plurality of transmitter electrodes for generating the transcapacitive image; and
creating a third estimate of common mode noise for the second absolute capacitive profile,
wherein the first estimate of common mode noise is created using the third estimate of common mode noise.

17. The method of claim 16, wherein determining the location lacking the input object in the transcapacitive image comprises:
updating the transcapacitive image to account for common mode noise using the first estimate of common mode noise;
determining a input object detection threshold from the updated transcapacitive image;
determining, from the updated image, each possible input object location satisfying the input object detection threshold; and
selecting, as the location lacking the input object, a region excluding each possible input object in the updated transcapacitive image.

18. The method of claim 12, wherein creating the second estimate of common mode noise based on the location and the transcapacitive image comprises:
determine, for each pixel along a transmitter electrode of a plurality of transmitter electrodes corresponding to the location lacking the input object, a noise value for the sensor electrode;
determine a third estimate of common mode noise for a transmitter axis absolute capacitive profile using the noise value; and
determine the second estimate of common mode noise from the transmitter axis absolute capacitance profile.

19. The method of claim 18, further comprising:
generating a fourth estimate of common mode noise for the first absolute capacitive profile.

20. The method of claim 12, wherein processing the positional information comprises performing at least one selected from a group consisting of reporting the positional information and changing a state of a host device according to the positional information.

* * * * *